UNITED STATES PATENT OFFICE.

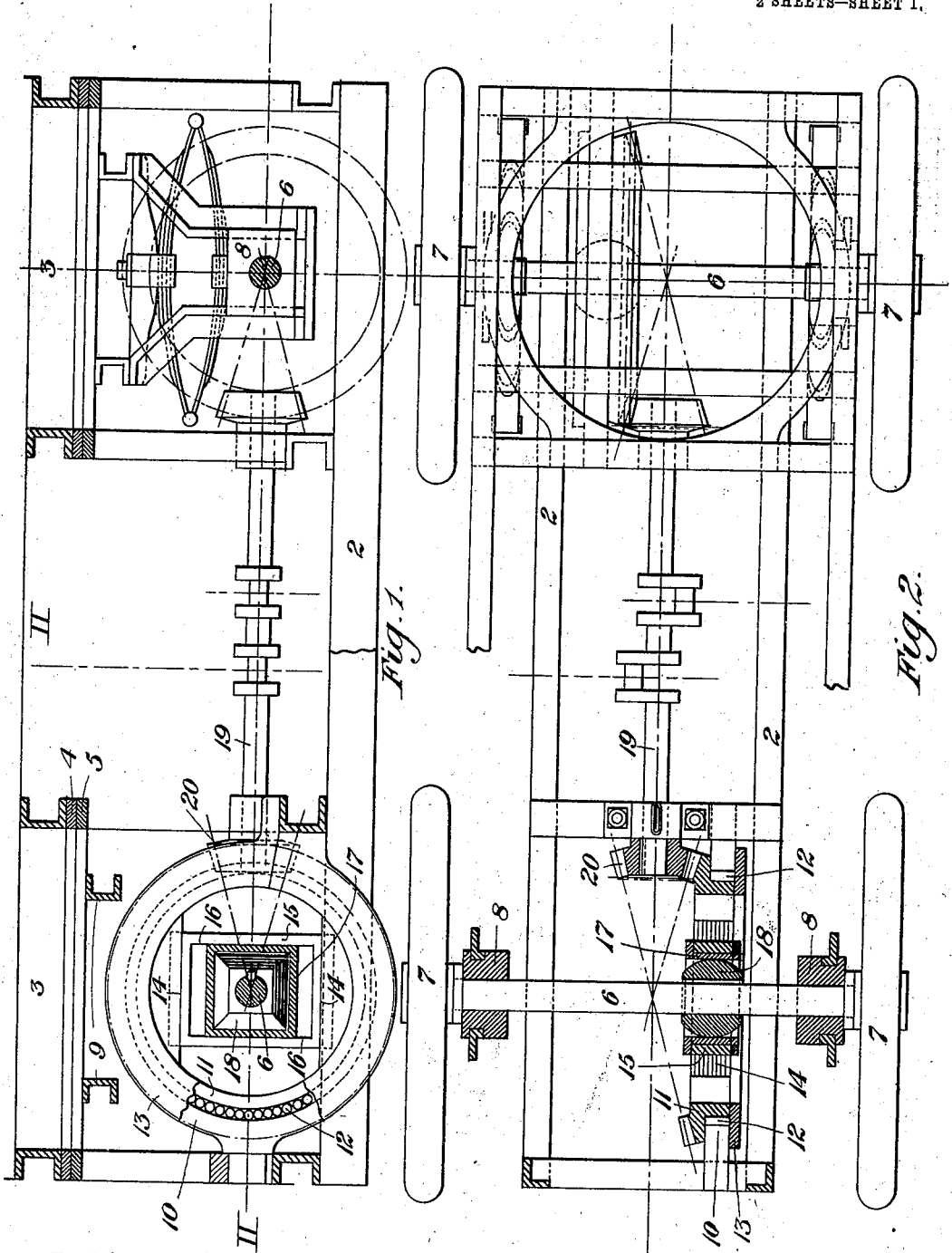

HARRY GILCHRIST, OF PITTSBURG, PENNSYLVANIA.

MOTOR-VEHICLE.

SPECIFICATION forming part of Letters Patent No. 726,672, dated April 28, 1903.

Application filed February 24, 1903. Serial No. 144,578. (No model.)

*To all whom it may concern:*

Be it known that I, HARRY GILCHRIST, a citizen of the United States, residing at Pittsburg, in the county of Allegheny and State of Pennsylvania, have invented certain new and useful Improvements in Driving Mechanism for Motor-Vehicles, of which the following is a specification, reference being had therein to the accompanying drawings, forming part of this specification, in which—

Figure 3:
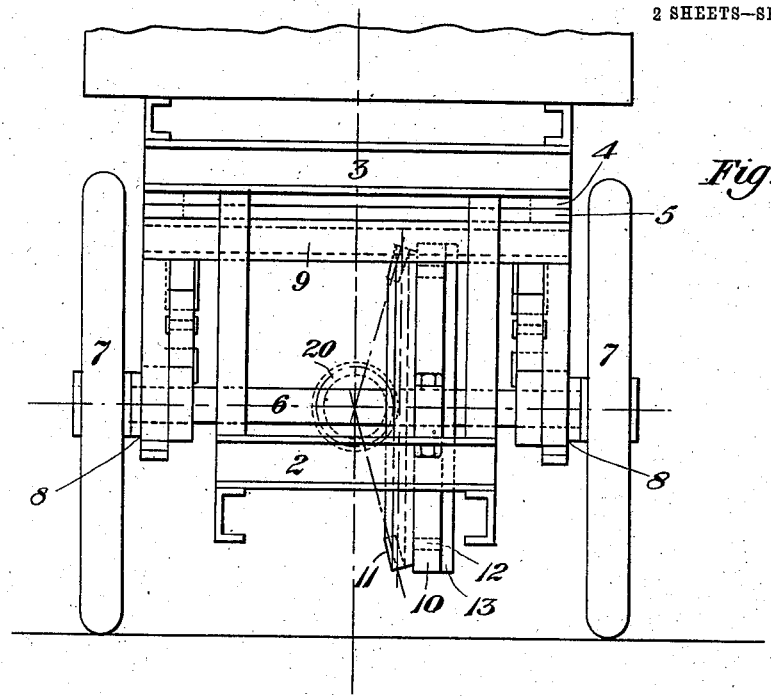
Figure 4:
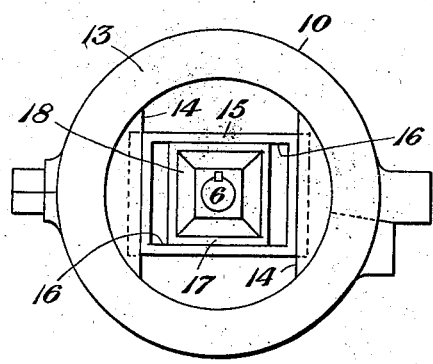
Figure 5:
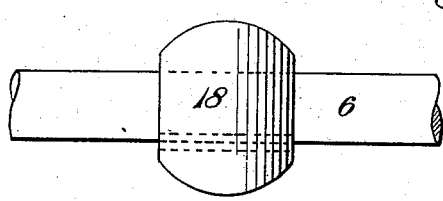

Figure 1 is a view in sectional elevation of my improved driving apparatus for motor-vehicles. Fig. 2 is a plan view thereof, the forward driving-axle and its operative mechanism being shown on a sectional plane indicated by the line II II of Fig. 1. Fig. 3 is a view in front elevation. Fig. 4 is a detail view of the driving bevel-wheel and its contained power-transmitting mechanism, showing the parts at right angle to the position shown in Fig. 1. Fig. 5 is a detail view of the axle-block.

My invention refers to improvements in driving mechanism for motor-vehicles; and the objects of the invention are to provide a driving apparatus which is capable of transmitting traction-power to one or both axles and wheels thereon from the motor while the vehicle is being turned. By my improved gearing one or both axles are driven and driving power is transmitted thereto at whatever position the axle may assume.

The invention is particularly adapted to heavy automobiles or trucks, such as delivery-wagons, &c., wherein the greatest possible traction is required, and while being well adapted to such types of vehicles it is nevertheless applicable to lighter forms.

Referring now to the drawings, 2 represents the main framework of the vehicle, which may be made of structural metal or other suitable form. The wagon-body is mounted upon a superstructure 3, between which and the main framework are interposed the fifth-wheels 4 and 5. The axles 6, carrying wheels 7, are mounted in bearings 8 8 at each side of a rotatable framework 9, having at its upward portion the under fifth-wheel 5. Rigidly secured to the under framework 2, at front and back, are the circular bearing-frames 10, preferably made in two halves for convenience in assembling, having a trunnion-support at one side and provided with inner annular peripheral bearings in which are rotatably mounted a bevel gear-wheel 11, intervening roller or ball bearings 12 being interposed to reduce friction. The bevel-wheel 11 is provided with any suitable means for retaining it in position, as an outer annular flange 13. Its inner portion is provided with opposite parallel sliding bearings 14 14, in which is mounted a sliding frame 15, adapted to move on said bearings in either direction from the center position shown in Fig. 1. The frame 15 is rectangular and is provided on its inner sides with parallel sliding bearings 16 16, normally at right angles to the bearing 14.

Within the frame 15, mounted on sliding bearings 16 16, is a rectangular box 17, adapted to slide in either direction from the middle position, as shown in Fig. 4, upon the sliding bearing 16. Secured to axle 6 is a rectangular block 18, rounded on its bearing sides, adapted to fill the square opening in the interior of frame 17 and to make contact with the inner faces thereof at whatever angle the axle may assume in turning and at whatever position the box 17 may assume in the rotation of the gear-wheel 11.

19 is a driving-shaft adapted to be rotated through suitable gearing by a motor or motors of any suitable type, the shaft and motor being mounted on the under framework 2 and controlled by proper valve or other regulating apparatus. The shaft 19 is provided with a bevel 20 at one or both ends, according to whether one or both axles are driven, but preferably with a bevel at each end, adapted to drive both axles, as shown in the drawings. Upon rotating shaft 19 corresponding rotating movement is transmitted to the bevel 11 and from it through sliding frame 15, box 17, and block 18 to axle 6. Upon turning either or both axles by the steering apparatus, which may be of any suitable construction, the axle or axles will assume an angular position across the vehicle, carrying with it the box 17 and also sliding frame 15, in driving engagement with the rotating bevel 11, so that at any position the bevel 11 will transmit rotating movement to the axle and wheels. This operation will be readily understood from the drawings and from the foregoing description, and it will be seen that in the operation of the machine in turning corners there will be a reciprocating compensating movement of the box and frame, so as to accommodate themselves to the varying positions assumed by the axle at whatever position it may be in, while always maintaining a driving engagement with the bevel-gearing.

The proportions of the frame-bearing and of the box-bearing in the frame may be regulated and designed according to the relative amount of steering action of the axle or axles, although such movement is not necessarily excessive, by reason of the bevel-gear 11 and its contained mechanism being closely adjacent to the longitudinal center of the machine and of the driving-shaft 19.

It will be understood that the proportions of the driving and driven gears may be varied to suit varying conditions of use or load and that the driven bevels and their contained mechanism may be located approximately in the longitudinal center of the machine, the driving-shaft and bevel-gears being slantingly mounted to suit such arrangement. By locating the driving-bevels as shown in Fig. 2 proper corresponding forward or back movement is transmitted simultaneously to both axles and equal power is exerted through each.

I have not shown any steering mechanism; but it will be understood that any suitable gearing may be employed by which the front or both front and back axles may be turned by the operator to steer the apparatus.

Having described my invention, what I claim is—

1. In driving apparatus for motor-vehicles, the combination with an axle and a rectangular block thereon, of a driving gear-wheel provided with interior parallel sliding bearings, a sliding frame mounted thereon, and a rectangular box slidingly mounted in the frame and engaging the axle-block, substantially as set forth.

2. In driving apparatus for motor-vehicles, the combination with an axle and a rectangular block thereon, of a driving gear-wheel provided with interior parallel sliding bearings, a sliding frame mounted thereon, and a rectangular box slidingly mounted in the frame and engaging the axle-block, with a surrounding bearing for the gear-wheel, substantially as set forth.

3. In driving apparatus for motor-vehicles, the combination with an axle and a rectangular block thereon, of a driving gear-wheel provided with interior parallel sliding bearings, a sliding frame mounted thereon, and a rectangular box slidingly mounted in the frame and engaging the axle-block, with a surrounding bearing for the gear-wheels provided with roller-bearings therein, substantially as set forth.

4. In driving apparatus for motor-vehicles, the combination with an axle and a rectangular block thereon, of a driving gear-wheel provided with interior parallel sliding bearings, a sliding frame mounted thereon, and a rectangular box slidingly mounted in the frame and engaging the axle-block, a driving gear-wheel in toothed engagement with said gear-wheel, and means for transmitting driving power thereto, substantially as set forth.

5. In a motor-vehicle, the combination with a swinging axle provided with a rectangular curved block, of a bevel-wheel provided with interior slidingly-mounted frames adapted to transmit movement from the bevel-wheels to the block and axle at varying positions, a bearing-frame for the bevel-wheel, and a driving-shaft provided with a bevel in engagement with said bevel-wheel, substantially as set forth.

6. In a motor-vehicle, the combination with a front and back swinging axle, provided with rectangular curved blocks, of surrounding bevel-wheels provided with interior sliding rectangular frames adapted to transmit movement from the bevel-wheels to the block and axle, bearings for said bevel-wheels, and a driving-shaft provided with driving-bevels in engagement with said bevel-wheels, substantially as set forth.

In testimony whereof I affix my signature in presence of two witnesses.

HARRY GILCHRIST.

Witnesses:
C. M. CLARKE,
R. H. McLARN.